W. HULL,

Assignor to SCOVILLE MANUFACTURING COMPANY.

SPRING HINGE.

No. 10,024. Reissued Jan. 31, 1882.

Witnesses:

T. J. Keane

Jas. R. Bowen.

Inventor:

Wesley Hull

By his Atty

Edwin H. Brown.

N. PETERS, Photo-Lithographer, Washington, D. C.

UNITED STATES PATENT OFFICE.

WESLEY HULL, OF FORT WAYNE, INDIANA, ASSIGNOR TO SCOVILL MANUFACTURING COMPANY, OF WATERBURY, CONNECTICUT.

SPRING-HINGE.

SPECIFICATION forming part of Reissued Letters Patent No. 10,024, dated January 31, 1882.

Original No. 200,657, dated February 26, 1878. Application for reissue filed July 5, 1881.

*To all whom it may concern:*

Be it known that I, WESLEY HULL, of Fort Wayne, in the county of Allen and State of Indiana, have invented a new and useful Improvement in Spring-Hinges, which improvement is fully set forth in the following specification and accompanying drawings.

Figure 1:
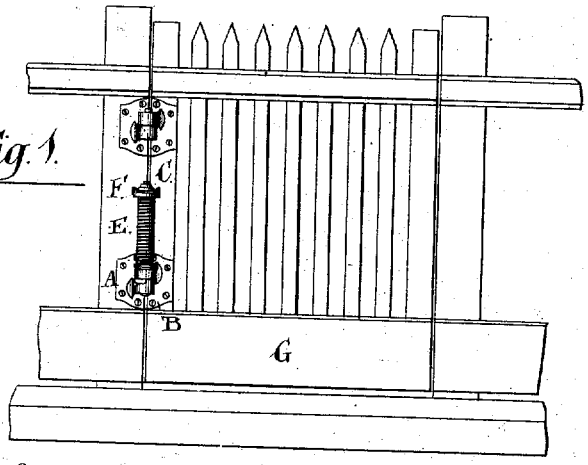
Figure 2:
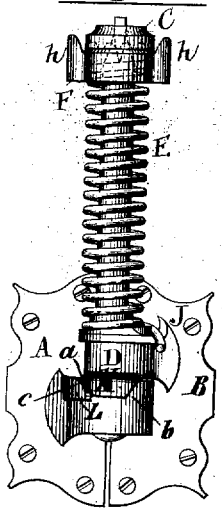
Figure 3:
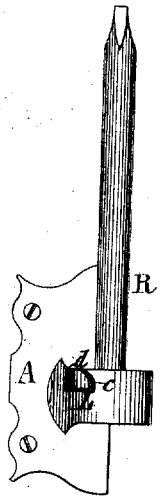
Figure 4:
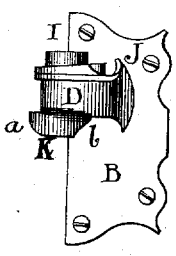
Figure 5:
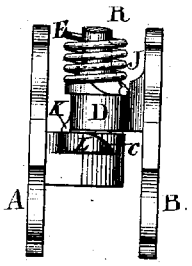
Figure 6:
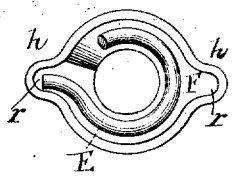
Figure 7:
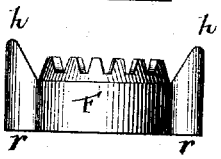

Figure 1 is a front view of a gate with hinges attached. Fig. 2 is a front view of hinge. Figs. 3, 4, and 5 are views of the hinge and detached parts, and Figs. 6 and 7 are detached views of a regulating-drum.

Like letters of reference indicate like parts.

My improvements consist in the combination, with the leaves of a hinge, a rod serving to connect the said leaves, and a spring adapted to impart a swinging motion to said leaves, of a lower bearing consisting of a circular shell extending from and turning with a socket affixed to one of the said leaves, wholly surrounding the rod, and receiving around it the end portion of the spring which acts upon the leaf of the hinge that is provided with said socket, thereby holding the spring away from said rod, and an inclined end bearing for the spring at the base of said shell. By these means I keep the spring in proper position parallel to the rod, and I at the same time keep it away from the rod.

The improvements further consist in the combination, with the leaves of the hinge and a rod whereby they are connected, of a spring adapted to impart a swinging motion to said leaves, and an upper bearing for the end portion of the spring, impinging against the outer side of the same and holding it out of contact with the rod, the spring being exposed below said upper bearing. Through this combination of parts I am also enabled to keep the spring away from the rod and avoid its abrasion by the rod.

The improvements further consist in the combination, with the leaves of a hinge, a rod connecting them, and a spring for imparting a swinging motion to them, of a lower bearing consisting of a shell fitting inside one end of the spring, and an upper bearing acting on the outside of the other end of the spring to keep it away from the rod.

The improvements further consist in a novel combination of parts hereinafter claimed.

In the accompanying drawings, G represents the gate. A and B represent different leaves of the hinge. On leaf B is formed a catch, J, extending up near the socket D. Upon the upper end of said socket is formed a thin circular shell, I, (see Fig. 4,) wholly surrounding the rod R, whereby the leaves are connected, and extending sufficiently from it to enter the lower end of spring E and keep it from coming in contact with rod R, thus avoiding friction. At the base of shell I, on the top of socket D, is formed an incline, terminating near catch J, designed to fit the lower end of spring E and to form an inclined bearing for the spring, so as to equalize the pressure upon it with a view to keep the spring as straight as possible when compressed. For a similar purpose an incline is formed in the regulating-drum F, to fit the upper end of said spring.

The rod R is rigidly secured to the leaf A, as seen in Fig. 3, detached view, and passes up loosely through socket D of leaf B, and extends above it sufficiently to receive the spring E and regulating devices. The spring encircles rod R and shell I. The extreme end of said spring, being bent out, engages catch J, by which it is held securely. The upper end of said spring E enters and fits within the lower end of the regulating-drum F. The regulating-drum at the upper end fits upon the rod R, but may be turned thereon. The flange or rim of the drum F forms an outside upper bearing, which impinges against the end portion only of the spring, and the latter is exposed beyond said upper bearing. Above it there is rigidly affixed to the rod R a cap, C, which is provided on the under side with notches or teeth, with which other notches on the top of the regulating-drum engage. As the rod R is connected to the leaf A of the hinge and the drum F and cap C are attached to this rod, the said drum and cap are attached to the said leaf A. The extreme upper end of said spring, being bent out, enters a recess, *r*, (see Fig. 6,) formed in the drum, by which it is held secure from turning. The upper end of the spring presses against the upper end of the interior of said drum, which is spirally inclined to form an inclined end bearing for the upper end of the spring, to equalize the pressure upon it, in order that it may not be forced against rod R when compressed in securing cap C and in operating the gate. By fitting within the drum F the upper end of the spring is kept from coming in contact with the rod R, thus avoiding friction being exerted on the spring. The spring, by being compressed, acts upon the regulating-drum F to keep the notches or teeth on its upper end engaged with the notches or teeth on the lower end of cap C, automatically holding said drum where it may be moved in regulating the tension of the spring to the required power to close the gate or door.

Projections *h h* on the regulating-drum F form a hold for the hand, by which to turn it in regulating the tension of the spring, to increase which it must be turned in the direction the spring is turned, when it will move over the inclines of the notches or teeth. When desiring to lessen the tension of the spring it will be necessary to force down the drum F until the notches or teeth become disengaged, thus allowing it to be moved when desired.

It is often necessary or desirable for certain purposes to have the gate remain open for the time being. For this purpose a projection or check, K, is formed on the socket D of leaf B, having a gentle incline, *a*, on the rear end and a steep incline, *b*, on the front. There is a projection, L, on the leaf A, having a gentle incline, *c*, in front and steep incline *d* on the rear of it. Thus both gentle inclines are opposite each other when the gate is closed, offering but little resistance to projection K passing over the projection L in opening the gate. But when the gate is opened almost or entirely against the fence the steep incline of the projection or check K drops down that of the projection L, thus locking the gate open at a point to which it is seldom, if ever, opened in general use, and thus giving ample protection to inclosures, and also affording the conveniences named.

Obviously the spring E tends to hold the projections K and L in contact through the resistance it offers to longitudinal compression.

The upper hinge of the gate G is so constructed as to allow the free operation of the lower hinge; or, if necessary, both may be spring-hinges.

What I claim as my invention, and desire to secure by Letters Patent, is—

1. The combination, with the leaves of a hinge, a rod serving to connect the leaves, and a spring adapted to impart a swinging motion to said leaves, of a lower bearing consisting of a circular shell extending from and turning with a socket affixed to one of the said leaves, wholly surrounding the rod, and receiving around it the end portion of the spring which acts upon the leaf of the hinge that is provided with said socket, thereby holding the spring away from said rod, and an inclined end bearing for the spring at the base of said shell, substantially as described.

2. The combination, with the leaves of a hinge and a rod whereby they are connected, of a spring adapted to impart a swinging motion to said leaves, and an upper bearing for the end portion of the spring, impinging against the outer side of the same and holding it out of contact with the rod, the spring being exposed below said upper bearing, substantially as specified.

3. The combination, with the leaves of a hinge and a rod whereby they are connected, of a spring adapted to impart a swinging motion to said leaves, a lower bearing consisting of a shell extending from and turning with a socket affixed to one leaf, fitting upon the rod and receiving around it one end portion of the spring, and an upper bearing for the other end portion of the spring, impinging against the outer side of the same and holding it out of contact with the rod, the spring being exposed between said lower bearing and upper outside bearing, substantially as specified.

4. The regulating-drum F, cap C, and rod R, in combination with spring E, secured to the exterior end of socket D, substantially as and for the purpose set forth and described.

WESLEY HULL.

Witnesses:

G. L. BITTINGER,

G. C. THOMAS.